US005575052A

United States Patent [19]

Thoresen

[11] Patent Number: 5,575,052
[45] Date of Patent: Nov. 19, 1996

[54] LIGHT RETRIEVING TOOL FOR USE WITH MINIATURE VILLAGE BUILDINGS

[76] Inventor: John S. Thoresen, 8307 Oxborough Ave. South, Bloomington, Minn. 55437

[21] Appl. No.: 502,631

[22] Filed: Jul. 14, 1995

[51] Int. Cl.[6] .......... B23P 19/00

[52] U.S. Cl. .......... 29/426.6; 29/278; 29/235; 81/486

[58] Field of Search .......... 29/426.6, 426.1, 29/426.5, 225, 235, 238, 270, 278; 81/3.8, 15.7, 486; 7/123; D2/643

[56] References Cited

U.S. PATENT DOCUMENTS

| | | | |
|---|---|---|---|
| D. 297,071 | 8/1988 | Mayer | D2/643 |
| 3,145,463 | 8/1964 | Hockett | 29/235 |
| 3,899,822 | 8/1975 | Armstrong | 29/235 |
| 4,240,192 | 12/1980 | Davis | 29/426.6 |
| 5,150,505 | 9/1992 | Drabek | 81/486 |

*Primary Examiner*—David P. Bryant
*Attorney, Agent, or Firm*—Haugen and Nikolai, P.A.

[57] ABSTRACT

A tool for facilitating removal of a light holder assembly from the interior of a miniature model building comprises an elongated rigid wire having an integrally-formed, U-shaped hook member disposed at its distal end and projecting at a predetermined angle with respect to the longitudinal axis of the wire. The other end of the wire is secured to a handle member. The spacing between the legs of the hook is such that the hook can be made to engage the inwardly extending notches on the lamp holder's leaf spring members, allowing sufficient tension to be placed on the leaf spring member to compress it to the point where the light holder assembly can be extracted through the opening in the building's wall.

5 Claims, 3 Drawing Sheets

LIGHT RETRIEVING TOOL FOR USE WITH MINIATURE VILLAGE BUILDINGS

BACKGROUND OF THE INVENTION

I. Field of the Invention

This invention relates generally lighted miniature buildings comprising holiday displays, and more particularly to a tool for retrieving a light bulb holder from the interior of the building when it has been inadvertently inserted totally through the opening in which the light bulb holder is intended to be mounted.

II. Discussion of the Prior Art

During the Christmas holiday season, people often decorate their homes with miniature ceramic or plaster buildings, commonly having a Victorian motif. Such a village may include church structures, train depots, houses, shops that are arranged to create a nostalgic winter scene. The buildings typically include a circular aperture in a rear wall thereof into which is fitted a bulb holder. When the bulb is illuminated, light exits windows and the like on the sides and front walls of the building.

The bulb holder generally comprises a somewhat cylindrical bulb socket and a pair of flat spring clips affixed to the socket on opposite side surfaces thereof. Each of the spring clips includes a pair of notches that extend inwardly from opposed side edges thereof that are intended to cooperate with the edge surface defining the circular opening through which the bulb is intended to pass. By compressing the leaf springs toward one another and inserting the bulb and socket through the circular opening in the building wall and then releasing the leaf spring members when the notches are juxtaposed with the opening in the wall surface, the force of the springs securely anchors the bulb and light socket within the interior of the building being illuminated.

A certain amount of care and dexterity are required when installing the light assembly within the building. If appropriate care is not taken, it is possible to totally insert the bulb, socket and leaf spring members through the opening and into the interior of the building. Now, when the leaf spring members are no longer compressed, they spread to a size that exceeds the diameter of the circular opening in the building wall, making it difficult to again retrieve the lighting assembly from the inside of the building.

Many of the buildings used in the holiday decorative scenes have become collector's items and tend to be quite expensive. Accordingly, care must be exercised in attempting to remove a light fixture that has fallen into the interior of the building so as to not mar or chip the building in any way. In the past, attempts to remove the light fixture inadvertently inserted too far into the building with needle-nose pliers or the like have been less than successful because of the propensity to damage the building structure in the effort to retrieve the light and light holder from the building.

For the foregoing reasons, a need exists for a tool or instrument that will facilitate retrieval of a light holder assembly from the interior of a miniature building structure in a way that will not cause damage to the building structure. The present invention fulfills such a need.

SUMMARY OF THE INVENTION

The present invention is concerned with a tool for facilitating removal of a clip-on light assembly that has unintentionally been inserted completely through the circular opening in a wall of an ornamental miniature building. The tool comprises a rigid metal wire having a rectilinear portion with first and second ends. The first end is bent to include a generally U-shaped hook oriented at a predetermined angle to the longitudinal axis of the wire. A handle member is secured to the second end of the wire. The spacing between the opposed legs of the U-shaped hook is dimensioned to span the portion of the spring clip on the light holder between the opposed notches.

In using the tool, the person pulls lightly on the lamp cord to bring one of the two spring clips partially out through the circular opening in the building wall. He next inserts the tool through the opening to engage the other spring clip such that the U-shaped hook at the end of the tool fits into the opposed notches in the spring clip. Now, by pulling on the tool's handle, the hooked spring clip is compressed towards the other to the point where the hooked spring clip can be pulled through the circular opening in the building's wall.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 2:
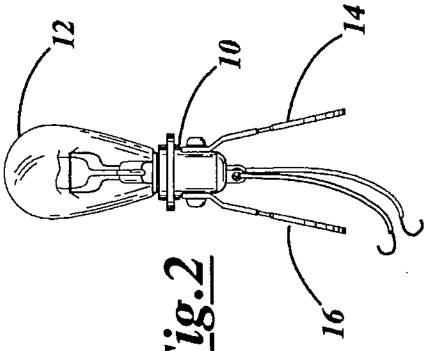
FIG. 2 is a side elevation view of the light holder of FIG. 1.
Figure 1:
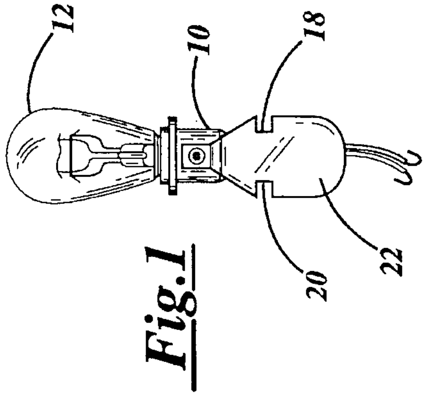
FIG. 1 is a front elevation view of a light holder assembly of the type used with "Christmas miniature village" buildings.

Referring to FIGS. 1 and 2 there is shown the typical prior art light holding fixture used with most miniature Christmas village buildings. It comprises a lamp socket 10 into which a bulb 12 may be screwed. The socket 10 is generally cylindrical and molded from an appropriate plastic capable of withstanding the temperatures encountered in illuminating the bulb 12. Riveted or otherwise attached to diametrically opposed side surfaces of the socket 10 are first and second leaf spring members 14 and 16. Each of the leaf spring members includes a pair of inwardly extending notches 18 and 20 (FIG. 1) and a surface as at 22 that can be readily gripped by a person's thumb or forefinger to permit the leaf spring members 14 and 16 to be compressed toward one another.

Figure 3:
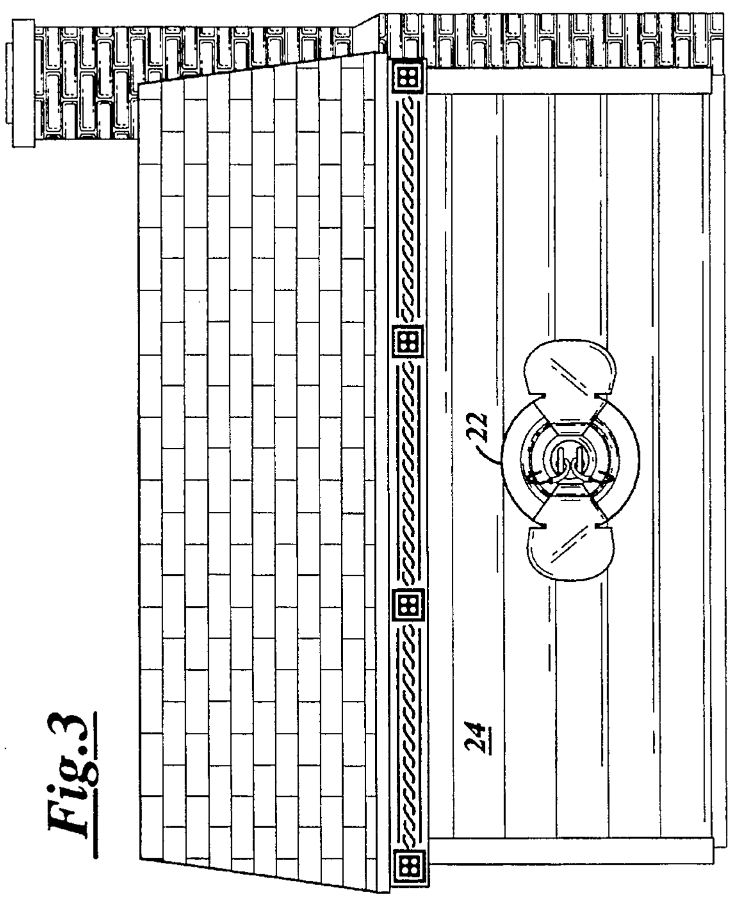
FIG. 3 is a partial view of the rear wall of the miniature building with a light holder assembly correctly installed therein.

As shown in FIG. 3, the light holder is installed into a circular opening 22 formed in a rear wall surface 24 of the building to be illuminated. This is accomplished by squeezing the surfaces 22 on each of the leaf spring members 14 and 16 toward one another and then inserting the bulb 12 and socket 10 into the opening 22 until the notches 18 and 20 on the leaf spring members are aligned with the edge defining the opening 22. Now, by releasing the pressure on the spring clips, they are allowed to spread until the notches 18 and 20 on each of the spring clip members engage the inner and outer surfaces of the wall 24 proximate the circular opening 22 to hold the light in place.

Figure 7:
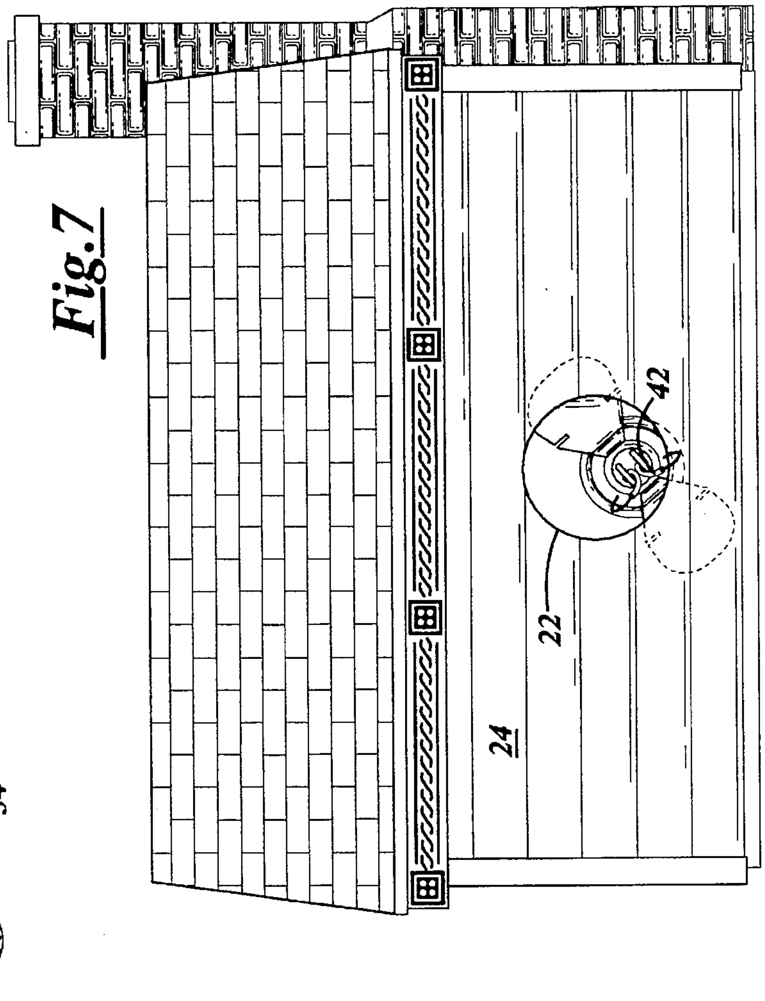
FIG. 7 shows a miniature building in which the light holder has been improperly installed.

Inadvertently, it can happen that the notches on the spring clip members are not accurately aligned with the edges defining the circular opening 22 and when the leaf spring members are released, the entire lamp holder and bulb may slip through the opening 22 into the interior of the miniature building. Thus, as illustrated in FIG. 7, the unconstrained leaf spring members spread to a size greater than the diameter of the circular opening 22 preventing easy withdrawal of the lamp assembly from the interior of the building.

Figure 4:
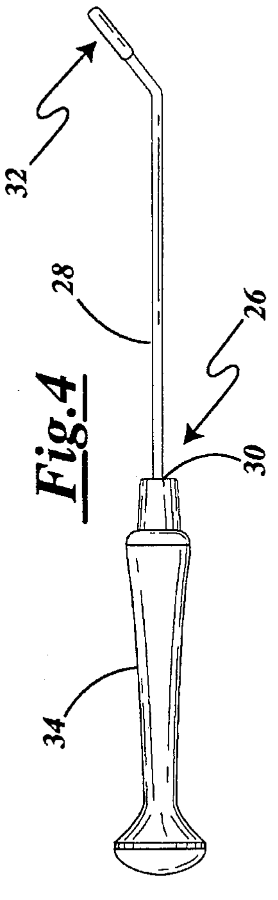
FIG. 4 is a side elevation of the light holder retrieving tool of the present invention.
Figure 6:
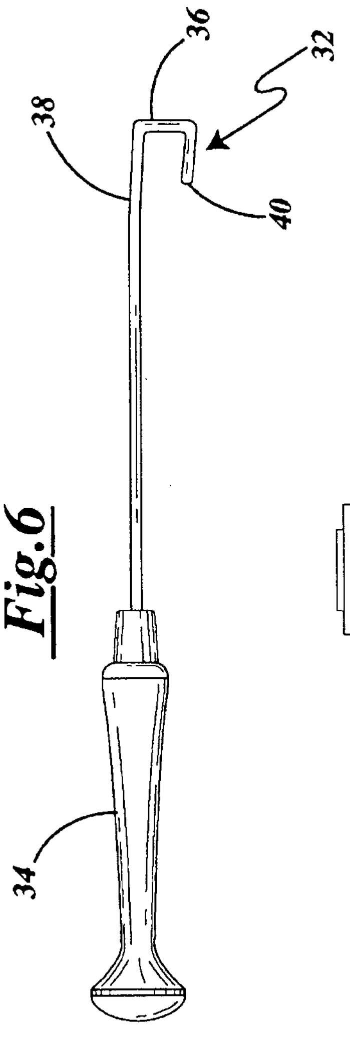
FIG. 6 is a bottom view of the tool of FIG. 4.
Figure 5:
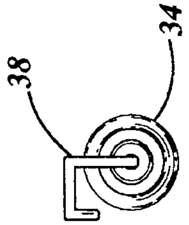
FIG. 5 is a right end view of the tool of FIG. 4.

FIGS. 4, 5 and 6 illustrate the tool of the present invention which can be readily used to retrieve the light holder from the interior of the miniature building. The tool is indicated generally by numeral 26 and is seen to comprise a rigid metal wire rod member 28 having a proximal end 30 and a distal end 32. Affixed to the proximal end of the rigid wire rod 28 is a handle member 34 that can readily be grasped in either hand by the user. The distal end portion 32 of the tool includes a U-shaped hook 46 having a first leg portion 38 bent at an angle of about 150° to the longitudinal axis of the rigid wire rod 28 and a second leg 40 that extends parallel to the leg 38, but is spaced therefrom by a distance that is only slightly greater than the portion of the leaf spring members 14 and 16 lying between the notches 18 and 20 thereof. Thus, the U-shaped hook can have its legs 38 and 40 passing through the notches 18 and 20 of the leaf spring members.

With no limitation intended, the rigid metal wire may comprise a 7/64 in. diameter rod fitted into a wooden or plastic handle having an overall length of approximately 2½ in. The length of the rectilinear segment of the wire may be 2⅜ in. The spacing between the two leg segments 38 and 40 may be about ⅜ in. The leg 40 may be 25/64 in. while the leg 38 joining to the straight segment of the wire may typically be 19/32 in.

To avoid marring or scratching of the building surfaces, it has been found convenient to dip the rigid wire portion of the tool in a suitable plastic, such as polyurethane, to provide a film coating over the surface thereof.

Figure 8:
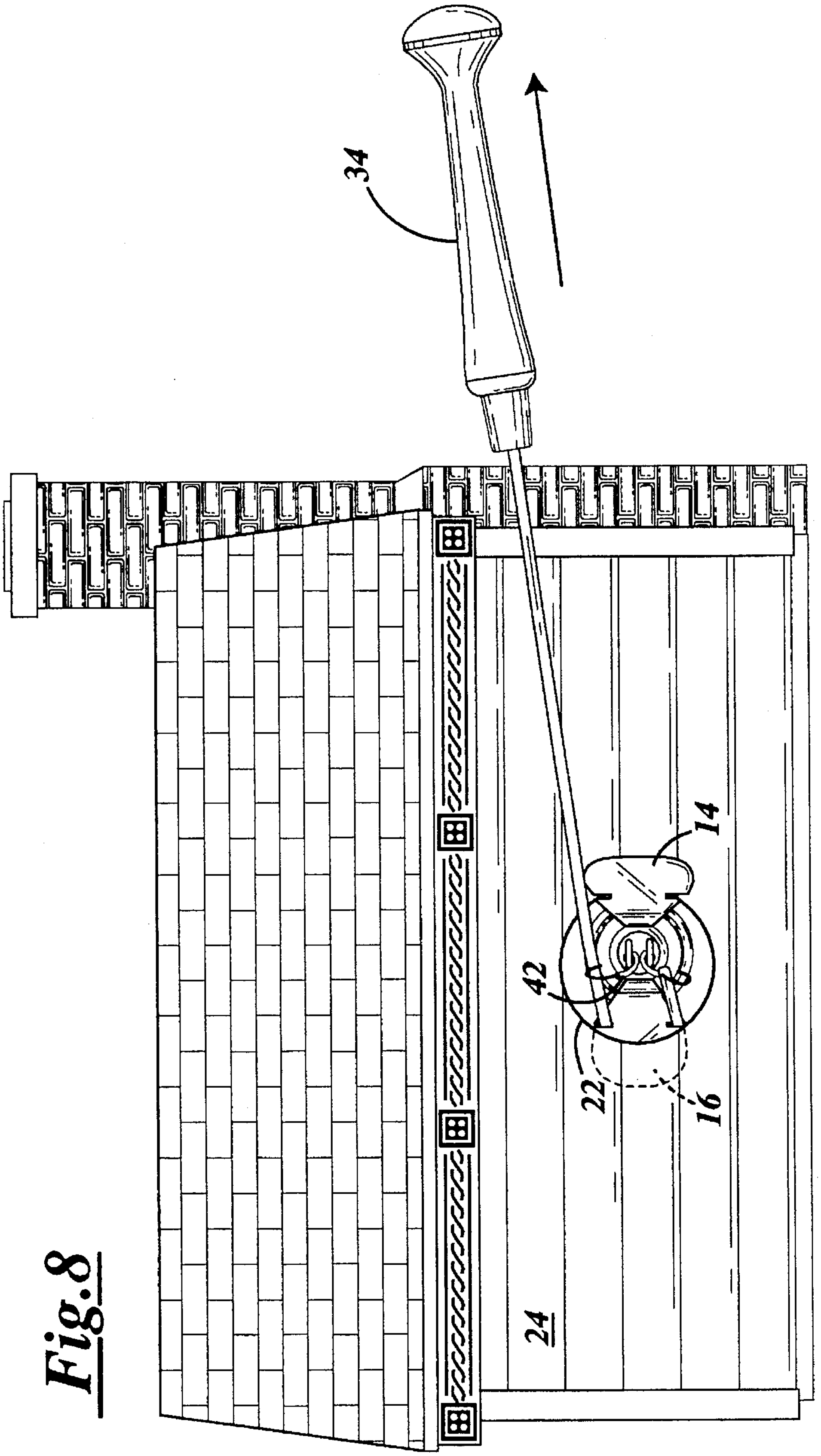
FIG. 8 is a view showing the tool of the present invention being used to retrieve the lamp holder assembly from the miniature building shown in FIG. 7.

Referring now to FIG. 8, a description will be given on how the tool of the present invention is used in readily retrieving a light holder assembly from the interior of a miniature building structure. The person will first grasp the electrical cord 42 and pull lightly thereon until one of the spring clip members 14 projects partly out through the opening 22. He or she next inserts the distal end 32 of the tool 26 through the opening 22 and manipulates the handle 34 until the U-shaped hook 36 engages the other spring clip member 16 in the vicinity of the notches 18 and 20 thereof. More particularly, the leg 38 of the tool is fitted into one of the notches while the leg 40 is made to reside in the other of the two notches.

Now, by pulling on the tool, the leaf spring member 16 is placed under compression and moved toward the spring clip member 14 to the point where the spacing between spring clip members is less than the diameter of the opening 22. By pulling back on the handle 34 of the tool, the spring clip member 16 can be brought out to the point where both surfaces 22 of the spring clips can be gripped by the user's thumb and forefinger and removed. The tool need not even touch the building's wall, thus minimizing any chance of marring the structure and diminishing its value.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A tool for facilitating removal of a clip-on light assembly that has been unintentionally inserted completely through a circular opening in a wall of an ornamental miniature building comprising:

(a) a rigid metal rod having a longitudinal axis and first and second ends, the first end including a generally U-shaped hook having first and second parallel legs, said hook being oriented at a predetermined angle to the longitudinal axis of the rod with the first leg laterally offset from a plane defined by said longitudinal axis and the second leg; and (b) a handle member secured to the second end of the rigid metal rod.

2. The tool as in claim 1 and further including an elastomeric coating on said rigid metal rod to resist marring of the miniature building during use.

3. The tool as in either of claims 1 and 2 wherein said light assembly includes a generally cylindrical light socket member for receiving a bulb therein and first and second flat spring clip members affixed to the socket member on diametrically opposite sides thereof, each clip member including a pair of notches extending inwardly from opposed side edges of the spring clip members, and the U-shaped hook being dimensioned to span a portion of the clip members between said pair of notches when said first and second legs are fitted into the pair of notches.

4. The tool as in claim 3 wherein said predetermined angle is about 150°.

5. A method for retrieving a light holder from the interior of a miniature building structure of the type having a circular opening in one wall thereof for receiving the light holder therein, the light holder comprising a light socket having a pair of outwardly flaring spring clips affixed thereto which, when unconstrained, have a maximum dimension greater than a diameter of the circular opening, the spring clips each including notches extending inwardly from opposed side edges of the spring clips for normally engaging a portion of the wall surrounding the circular opening comprising the steps of:

(a) withdrawing the light holder until one of the spring clips extends partially out through the circular opening far enough to be grasped with the user's fingers;

(b) inserting a tool through said circular opening, the tool comprising an elongated rigid wire having a straight shank portion, a proximal end and a distal end, where the distal end has an integrally formed, U-shaped hook disposed at a predetermined angle to the straight shank portion, the proximal end having a handle affixed thereto;

(c) engaging the U-shaped hook with the notches on the other of the spring clips;

(d) pulling on the tool to compress the other spring clip sufficiently to permit it to clear the wall surrounding the circular opening; and (e) removing the light holder from the building through the circular opening.

* * * * *

UNITED STATES PATENT AND TRADEMARK OFFICE

CERTIFICATE OF CORRECTION

PATENT NO. : 5,575,052

DATED : November 19, 1996

INVENTOR(S) : John S. Thoresen

It is certified that error appears in the above-indentified patent and that said Letters Patent is hereby corrected as shown below:

In column 4, claim 1(a), line 14, please delete "rod" and insert -- wire --.

In column 4, claim 1(a), line 15, please delete "including" and insert -- forming --.

In column 4, claim 1(a), line 18, please delete "rod" and insert -- wire --.

In column 4, claim 1(a), line 22, please delete "rod" and insert -- wire --.

In column 4, claim 2, line 24, please delete "rod" and insert -- wire --.

Signed and Sealed this

Fourth Day of March, 1997

*Attest:*

Bruce Lehman

BRUCE LEHMAN

*Attesting Officer*

*Commissioner of Patents and Trademarks*